M. E. PAYNE.
ADJUSTABLE ORCHARD PLOW.
APPLICATION FILED MAR. 15, 1916.

1,198,571.

Patented Sept. 19, 1916.

WITNESSES:
Rob't D. Pearson.
C. E. Lodge.

INVENTOR.
Morgan E. Payne
BY F. C. Bates
ATTORNEY.

UNITED STATES PATENT OFFICE.

MORGAN E. PAYNE, OF MORGAN HILL, CALIFORNIA.

ADJUSTABLE ORCHARD-PLOW.

1,198,571.  Specification of Letters Patent.  Patented Sept. 19, 1916.

Application filed March 15, 1916. Serial No. 84,357.

*To all whom it may concern:*

Be it known that I, MORGAN E. PAYNE, a citizen of the United States, and a resident of Morgan Hill, in the county of Santa Clara and State of California, have invented a certain new and useful Improvement in Adjustable Orchard-Plows, of which the following is a specification.

My invention relates to improvement in adjustable orchard plows, and the objects of my invention are: first to provide an adjustable orchard plow of simple and durable construction, capable of being used in orchards for plowing close to the trees, or in any other place where close plowing may be required.

A further object is to provide an adjustable orchard plow that may be operated single or attached to the draw bar of a tractor, having gang plows attached thereto and quickly removed when not required, and one that may be quickly adjusted to and from the tree as the operator may require, and one that can be adjusted to enter the ground at any depth required, and one that can be quickly adjusted to run out of the ground when so required.

A still further object of my invention is generally to improve this class of orchard plows so as to increase their utility, durability and efficiency.

Further objects and advantages will appear in the following description, it being understood that various changes in form, proportions and minor details of construction may be resorted to within the scope of the appended claims.

Figures 1, 2:
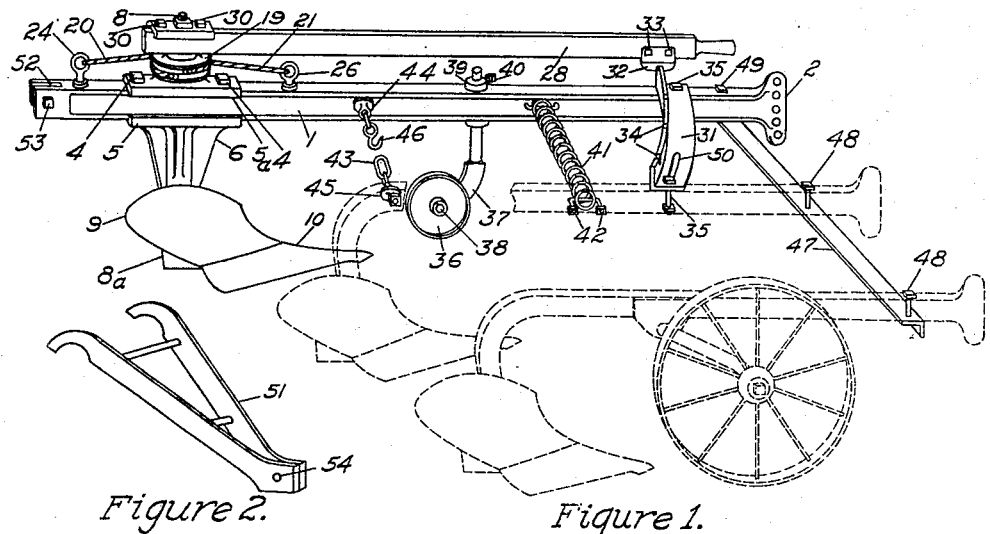
Figure 3:
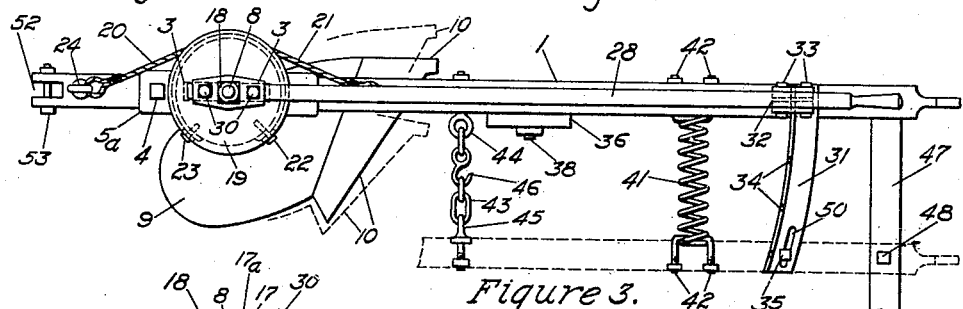
Figures 4, 5, 6:
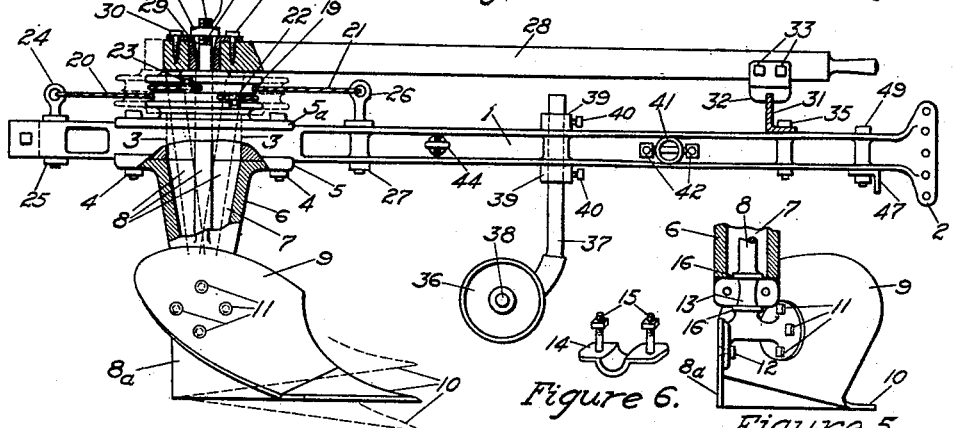

For a full understanding of the invention and the merits thereof, reference is to be had to the following description and accompanying drawings, in which:

Figure 1 is a perspective view of my adjustable orchard plow attached to a set of gang plows showing the connections thereto. Fig. 2 is a perspective view of attachable handles which may be used with my adjustable orchard plow when the same is detached from the gang plows. Fig. 3 is a plan view of my adjustable orchard plow, showing lever arm and adjustable sheave, and connections in place. Fig. 4 is a side elevation, in part sectional view showing plow in position, and adjustable parts thereof. Fig. 5 is a rear detail elevation of my adjustable orchard plow showing shaft connection to mold board, and shaft bearing end of casing with bearing cap removed. Fig. 6 is a perspective view of the adjustable shaft bearing cap, removed.

Corresponding and like parts are referred to in the following description and indicated in all the views of the drawing by the same reference characters.

My improved adjustable orchard plow forming the subject matter of the present invention is principally designed for orchard plowing.

The device comprises a plow beam 1, at the front end thereof is shown draft connection 2, to which a clevis and draw bar may be attached, this plow beam 1 may be made of iron or any other suitable material of the required length to allow the plow to drop in furrow behind second plow while passing a tree, when attached to gang plows. Near the rear end of said plow beam 1 is longitudinal slot 3 as shown in dotted lines in Figs. 3—4, which will be more fully hereinafter described. Fastened to said plow beam 1 on the underside thereof, by bolts 4 and iron flanges 5—5$^a$ is iron casing 6, said casing having a tapering slot therein as shown at 7, adapted to engage shaft 8, in connection with slot 3 in plow beam 1, said shaft 8 being fastened to mold board 9 and landside of plow 8$^a$ by countersunk bolts 11—12, plow share is shown at 10 in three positions, elevated, intermediate and lowered, the same being operated by lever arm 28, which will be hereinafter more fully explained. Said shaft 8 having its lower bearing at the lower end of casing 6 as shown at 13, the cap of said bearing is shown at 14 in Fig. 6, the same being held in place on casing 6 by bolts 15. Collars 16 are shown on shaft 8 which are an integral part of said shaft 8 adapted to prevent any up or down motion of shaft 8 in said casing 6, said shaft 8 being round up to the upper side of flange 5$^a$, and square to line 17, from line 17 said shaft 8 is made round with a thread cut thereon at 17$^a$ to receive adjusting nut 18. Connected to the square portion of said shaft 8 and resting on flange 5$^a$ is double sheave wheel 19, said sheave wheel having a square hole through the center thereof adapted to fit over the square portion of shaft 8, fastened to said sheave 19 are wire ropes 20—21 by clamps 22—23, said wire rope 20 passing around sheave 19 and fastened to eye bolt 24, said eye bolt passing through plow beam 1 and is held in place by nut 25, said wire rope 21, being fastened to sheave 19 by clamp 23, passes around sheave 19 in the opposite direction from wire rope 20, and is fastened to eye bolt 26, said eye bolt passing through plow beam 1, and is held in place by nut 27.

Lever arm 28 is shown connected to shaft 8 by square hole socket 29, the same being made of cast iron and having a square hole therein to fit square portion of shaft 8, the upper portion of said hole being larger at the top than at the bottom thereof, for the purpose of allowing shaft 8 to take the different angles as shown in dotted lines in casing 6 when in operation, said socket 29 being fastened to lever arm 28, by bolts 30, and held in place on shaft 8 by nut 18, said lever arm 28 extending forward a distance to which is fastened plate 32 by bolts 33, said plate 32 connecting with notched bar 31, in which is shown a plurality of notches 34, said notch bar 31 being fastened to plow beam 1 by bolts 35. This lever arm 28 may extend any distance forward that may be required to operate the plow from the seat on a tractor. Gage wheel is shown at 36 attached to arm 37 by fulcrum pin 38, said arm 37 passing through plow beam 1 and having two collars 39 thereon, said collars 39 having set screws 40 for the purpose of adjusting said wheel 36, up or down as to the depth of the furrow required in the ground. A spring is shown at 41, held in place on plow beam 1, and gang plow beam by staple bolts 42, this spring is for the purpose of assisting said plow beam 1 in returning back to its original position when in operation. Adjusting chain is shown at 43, connected to plow beam 1 by eye bolt 44, and eye bolt 45 on gang plow beam, said chain having an adjusting hook 46 connected therewith, adapted to let out, or take up said chain, as to the width of furrow required, said plow beam 1 is connected to gang plows by angle iron bar 47, and bolts 48 on the plow beams of said gang plows, and swivel bolt 49 on plow beam 1, a slot 50 is shown in notched bar 31 for the purpose of allowing plow beam 1 to turn on swivel bolt 49. When my adjustable orchard plow is used separate from gang plows, attachable handles 51 may be used bolted in slot 52, by bolt 53 passing through hole 54 at the lower end of said handles.

The operation of my adjustable orchard plow is as follows: A slight movement of lever arm 28, to the right as the plow advances will raise point of plow share 10 upward by sheave 19 and wire rope 20, said shaft 8 taking position as shown in dotted lines in casing 6 with the share 10 of the plow elevated which turns plow from tree and land, when lever arm 28 is brought back to its normal position shaft 8 stands upright in casing 6, as shown in full lines, and plow is in normal position, the reverse movement of lever arm 28 will draw shaft 8 forward in casing 6 as shown in dotted lines by sheave 19 and wire rope 21, this movement sets point of plow down and turns plow to land. The depth required to plow is controlled by gage wheel 36 the same being adjusted by arm 37, and collars 39 and set screws 40. Notch bar 31 has a plurality of notches cut therein for the purpose of holding lever arm 28 in position set. This plow is controlled to and from tree and roots of tree by said lever arm 28, as required by operator from the seat on a tractor.

I do not wish to confine myself to the mold board plow alone, as a disk plow may be attached and used with my device with equal success.

Having thus described my invention, what I claim and desire to secure by Letters Patent, is:

1. An orchard plow comprising a plow beam having a longitudinal slot therein, a casing secured to the plow beam said casing having a tapering opening registering at its larger end with the longitudinal slot, a bearing secured to one end of the casing, a shaft passing through said slot and journaled in said bearing said shaft having spaced collars engaging the upper and lower sides of the bearing, a moldboard mounted on the lower end of the shaft, means mounted on the upper end of the shaft for tilting the same in its bearing, the shaft engaging the ends of the longitudinal slot at the limits of its tilting movement, substantially as shown and described.

2. An orchard plow comprising a plow beam having a longitudinal slot therein, a casing secured to the plow beam, said casing having a tapering opening registering at its larger end with the longitudinal slot, a bearing secured to one end of the casing, a shaft having a squared upper end passing through said slot and pivoted in said bearing, said shaft having spaced collars engaging the upper and lower sides of the bearing, a moldboard mounted on the lower end of the shaft, means mounted on the upper end of the shaft for tilting the same in its bearing, the shaft engaging the ends of the longitudinal slot at the limits of its tilting movement, said means comprising a double sheave secured to the upper end of the shaft, oppositely directed cables each secured at one end to the double sheave and at the other end to the plow beam, and an operating lever having a tapering opening at one end square in cross section fitting over the squared end of the shaft, adapted to permit the shaft to assume different angular positions in said opening when the lever is operated, substantially as and for the purpose described.

In testimony whereof I have hereunto affixed my signature in the presence of two subscribed witnesses.

MORGAN E. PAYNE.

Witnesses:
 ROBT. D. PEARSON,
 C. E. LODGE.

Copies of this patent may be obtained for five cents each, by addressing the "Commissioner of Patents, Washington, D. C."